(12) United States Patent
Eto et al.

(10) Patent No.: US 8,164,996 B2
(45) Date of Patent: Apr. 24, 2012

(54) POWER ADJUSTMENT METHOD, INFORMATION WRITE METHOD AND INFORMATION WRITE MEDIUM

(75) Inventors: Soichiro Eto, Tokyo (JP); Koichi Watanabe, Hachioji (JP); Harukazu Miyamoto, Higashimurayama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/227,030

(22) Filed: Sep. 7, 2011

(65) Prior Publication Data

US 2011/0317532 A1 Dec. 29, 2011

Related U.S. Application Data

(63) Continuation of application No. 12/569,059, filed on Sep. 29, 2009, now Pat. No. 8,050,158.

(30) Foreign Application Priority Data

Jul. 3, 2009 (JP) .................................. 2009-158686

(51) Int. Cl.
*G11B 7/00* (2006.01)
(52) U.S. Cl. ................. 369/47.51; 369/53.26; 369/59.11
(58) Field of Classification Search ...... 369/47.5–47.53, 369/116, 59.11, 53.26
See application file for complete search history.

(56) References Cited

U.S. PATENT DOCUMENTS

| | | | |
|---|---|---|---|
| 2004/0017751 A1 | 1/2004 | Matsumoto | |
| 2004/0233808 A1* | 11/2004 | Takeda | 369/47.53 |
| 2005/0128911 A1* | 6/2005 | Miyashita et al. | 369/47.53 |
| 2005/0207299 A1* | 9/2005 | Yamaguchi et al. | 369/47.53 |
| 2006/0077836 A1 | 4/2006 | Yu et al. | |
| 2007/0053264 A1 | 3/2007 | Yu | |
| 2007/0115775 A1 | 5/2007 | Baek | |
| 2007/0121461 A1* | 5/2007 | Kobayashi et al. | 369/59.11 |
| 2007/0286042 A1 | 12/2007 | Eto et al. | |
| 2008/0013424 A1 | 1/2008 | Cho et al. | |
| 2008/0130472 A1 | 6/2008 | Wang | |
| 2008/0186817 A1 | 8/2008 | Kuijper | |
| 2009/0034381 A1* | 2/2009 | Shoji et al. | 369/53.13 |
| 2009/0122674 A1* | 5/2009 | Tsukuda | 369/47.53 |
| 2009/0168622 A1* | 7/2009 | Sato et al. | 369/47.53 |

FOREIGN PATENT DOCUMENTS

JP 2007-334922 12/2007

OTHER PUBLICATIONS

Blue-ray Disc Rewritable Format, Part 1, Basic Format Specifications, Blu-ray Disc Founders, Basic Format, Version 1.02, Jun. 2004, pp 197-200.

* cited by examiner

*Primary Examiner* — Thang Tran
(74) *Attorney, Agent, or Firm* — Antonelli, Terry, Stout & Kraus, LLP.

(57) ABSTRACT

An evaluation method and print wire method which includes (a) fitting a modulation characteristic formula $M,m=Msat(1-(Pws-Pasy)/(Pw,m-Pasy))$ having a saturated modulation Msat, write start power Pws, and asymptotic power Pasy as parameters to a relation between a plurality of kinds of write power Pw,m and a modulation M,m which is obtained from a signal amplitude of a trial-written signal, and finding an index value of an error which occurs in the fitting step; and (b) evaluating whether or not the relation between the write power and the modulation is valid for write power adjustment by using the index value of the error and a predetermined value the print write method further including (c) setting the write power based upon the result of evaluating and executing a write power process with the set write power.

4 Claims, 8 Drawing Sheets

POWER ADJUSTMENT METHOD, INFORMATION WRITE METHOD AND INFORMATION WRITE MEDIUM

CROSS REFERENCE TO RELATED APPLICATION

This application is a continuation of U.S. application Ser. No. 12/569,059, now U.S. Pat. No. 8,050,158, filed Sep. 29, 2009, the contents of which are incorporated herein by reference.

INCORPORATION BY REFERENCE

The present application claims priority from Japanese Patent application JP2009-158686 filed on Jul. 3, 2009, the content of which is hereby incorporated by reference into this application.

BACKGROUND OF THE INVENTION

The present invention relates to a power adjustment method for adjusting write power, an information write method with the power adjustment conducted, and an optical information write medium which retains information to be used in the adjustment of the write power.

At the present time, the CD (Compact Disc), DVD (Digital Versatile Disc), BD (Blu-ray Disc) and so on are put on the market and spread as optical discs which are optical information write media. In these optical discs, there are various kinds such as the ROM (Read Only Memory) type, R (Recordable) type which is write-once type, and RE (Rewritable) type. Information writing and reading in an optical disc are conducted by irradiating the optical disc with laser light in an optical disc which is an optical information write apparatus. Information writing is conducted by changing irradiation power of laser light and forming marks changed in optical characteristics on a data layer of the optical disc. Information reading is conducted by irradiating the data layer of the optical disc with laser light having power lower than that used when forming the marks and detecting a difference in reflected light quantity every irradiation position.

The optimum write power used when writing information differs depending upon the classification of the optical disc and optical disc fabricating maker. It is necessary to set the optimum write power in the drive according to the kind of the optical disc. Even if optical discs are the same in kind, however, the optimum write power differs every optical disc because of the fabrication dispersion. In some cases, optimum writing cannot be implemented if the same write power is used. Even if the same optical disc is used, optimum writing cannot be implemented with the same setting power in some cases because of power dispersion of drives. Therefore, each drive has a configuration in which trial writing is conducted in a predetermined area and optimum write power is adjusted depending upon the optical disc prior to writing in the optical disc.

As a write power adjustment method using trial writing, a method using a relation between write power and the modulation is proposed for, for example, BD-RE discs. This is disclosed in Non-Patent Document 1 which is a document of specifications for BD-RE.

According to this method, optimum write power Pw-opt is calculated by using a relation between write power Pw and a modulation M, indicated write power Pind, a target coefficient value $\kappa$, and a coefficient $\rho$ which are predetermined parameters. These parameters are previously written in a management area of the optical disc. First, a predetermined signal is written in a predetermined area of the optical disc by using write power Pw,m (where m is an integer) of a plurality of kinds in the vicinity of the indicated write power Pind, and the written signal is read. As a result, a modulation M,m, which is a value obtained by dividing an amplitude of a read signal by a higher envelope level, is acquired so as to be associated with the write power Pw,m. Then, a relation between an evaluated value M,m×Pw,m and the write power Pw,m is subjected to straight line approximation over a predetermined power range having Pw,m as its center. A value of the write power Pw,m obtained when the evaluated value M×Pw becomes zero is calculated as a write power threshold Pthr,m. In a relation between a target write power Ptarget, m=$\kappa$×Pthr,m obtained by multiplying the calculated Pthr,m by the target coefficient value $\kappa$ and the write power Pw,m, write power Pw satisfying the relation Ptarget=Pw is determined as optimum target write power Ptarget-opt, and a value obtained by multiplying the optimum target write power Ptarget-opt by the coefficient $\rho$ is determined as optimum write power Pw-opt.

According to the method described heretofore, it is possible for each drive to set optimum write power for each optical disc and optimum writing can be implemented. Since the write power adjustment described in Non-Patent Document 1 and described heretofore is a scheme executed by using the target coefficient value $\kappa$, this write power adjustment method is hereafter referred to as $\kappa$ scheme.

A write power adjustment method which uses the relation between the write power and the modulation and which differs from the above-described method is disclosed in Patent Document 1.

According to this method, optimum write power Pw-opt is calculated by using a ratio $\alpha$=Pw-opt/Pth between optimum write power Pw-opt and a write power threshold Pth which are predetermined parameters. First, a predetermined signal is written in a predetermined area of an optical disc by using write power Pw,m (where m is an integer) of a plurality of kinds, and the written signal is read. As a result, a modulation M,m associated with each write power Pw,m is acquired. Then, write power correction values Pc,n (where n is an integer) of a plurality of kinds are set. Pc,n that makes a relation between an evaluated value M,m×(Pw,m−Pc,n) and corrected write power (Pw,m−Pc,n) closest to a straight line is determined as an optimum write power correction value Pc-opt. When straight line approximation is applied to a relation between an evaluated value M,m×(Pw,m−Pc-opt) and corrected write power (Pw,m−Pc-opt), a value of the corrected write power (Pw−Pc-opt) that makes an evaluated value M×(Pw−Pc-opt) equal to zero is calculated as a corrected write power threshold Pth'. A write power threshold Pth=Pth'+Pc-opt is calculated by using the calculated Pth'. Optimum write power Pw-opt=$\alpha$×Pth is determined by multiplying the calculated Pth by a coefficient $\alpha$.

If this method is used, then the optimum read power can be set with high precision and optimum writing can be implemented with respect to an optical disc having a curvilinear relation between an evaluated value M×Pw and write power Pw and a medium having a modulation which changes uniquely (having a magnification which changes uniquely at all measurement points) according to the state of an optical disc and the read condition.

Here, the Patent Document 1 in this specification is JP-A-2007-334922.

Further, the Non-Patent Document 1 in this specification is "System Description Blu-ray Disc Rewritable Format," Part 1, Basic Format Specifications, Version 1.02, Blu-ray Disc Founders, June 2004, pp. 197-200.

SUMMARY OF THE INVENTION

In some optical discs, however, the relation between the write power and the modulation in trial writing varies irregularly (varies non-correlatively at individual measurement points). In some cases, optimum write power cannot be determined by using the above-described write power adjustment method.

As an example, the case of a multi-layer optical disc having at least two layers will now be described. In the multi-layer optical disc, a plurality of data layers are stacked in the volume direction, and writing and reading for each layer are conducted by focusing irradiation light into the layer. At this time, layers other than that layer are also irradiated with the incident light. Therefore, difference in states, such as the unwritten state or the written state, of other layers exerts an influence upon writing and reading. FIG. 5 in Patent Document 1 shows an example in which the modulation in a multi-layer optical disc having two data layers change uniformly (changes in magnification) depending upon whether the other layer is in the unwritten state or the written state. As for the variation of the modulation, it is described that write power can be determined with high precision by using the write power adjustment method described in Patent Document 1. However, variations of the write power and the modulation in the multi-layer optical disc are not limited to the variations shown in FIG. 5 in Patent Document 1.

For example, it is now supposed that areas in the unwritten state and areas in the written state are mixedly present in other layers. At this time, effective power of irradiation light transmitted through other layers and applied to the layer is influenced by other layers to change. As a result, the effective power at the time of writing changes depending upon the write position. Furthermore, since reflected light detected at the time of reading is superposition of light beams reflected and transmitted by other layers, the reflected light is influenced by other layers. As a result, the reflected light at the time of reading also changes depending upon the read position. If the state of other layers is not uniform in the trial writing area in the write power adjustment, therefore, the relation between the write power and the modulation obtained by trial writing exhibits the modulation that changes irregularly (changes non-correlatively at individual measurement points). FIG. 1 shows an example of a result obtained by measuring the relation between the write power and the modulation, i.e., modulation characteristics of a multi-layer optical disc having four data layers in the case where all of other layers are in the unwritten state and in the case where areas in the unwritten state and areas in the written state are mixedly present in other layers. In the case where areas in the unwritten state and areas in the written state are mixedly present in other layers, the modulation at each write power changes irregularly as compared with the case where all of other layers are in the unwritten state and modulation characteristics that are different from those in the case where all of other layers are in the unwritten state are exhibited.

This variation exerts influence upon the calculation precision of the optimum write power in the write power adjustment. FIG. 2 shows a relation between write power Pw,m and target write power Ptarget,m obtained when the write power adjustment of the κ scheme has been executed on the basis of the result shown in FIG. 1. An intersection of a plot shown in FIG. 2 and Ptarget=Pw is optimum target write power Ptarget-opt which is used to calculate the optimum write power. In the case where areas in the unwritten state and areas in the written state are mixedly present in other layers, Ptarget-opt that is different from that in the case where all of other layers are in the unwritten state is calculated. It is thus appreciated that accurate optimum write power cannot be determined. FIG. 3 shows a result obtained by executing the write power adjustment method of the κ scheme one hundred times in the state in which the same optical disc as that shown in FIG. 1 is used and areas in the unwritten state and areas in the written state are mixedly present in other layers of the trial writing area, and finding a calculation error between optimum write power calculated each time and true optimum write power. The frequency of implementation of accurate write power adjustment with a calculation error of 0% is low, and the calculation error distributes to −10% in the worst case. Therefore, it is appreciated that sufficient write power adjustment cannot be implemented by using the write power adjustment method of the κ scheme for the variations shown in FIG. 1. This is caused by that the optimum write power is calculated by using a differential value of the modulation characteristics obtained by the trial writing in the write power adjustment method of the κ scheme and consequently errors are apt to occur for local variations.

FIG. 4 shows a result obtained by executing the write power adjustment method described in Patent Document 1 one hundred times in the state in which the optical disc shown in FIG. 1 is used and areas in the unwritten state and areas in the written state are mixedly present in other layers of the trial writing area, and finding a calculation error between optimum write power and true optimum write power in the same way as the foregoing description. The distribution in FIG. 4 becomes narrow as compared with that in FIG. 3. However, the calculation error distributes to ±4% its maximum. Thus, it is appreciated that sufficient write power adjustment cannot be implemented. Its cause is as follows: there is no limit in determination of the optimum value of Pc in the write power adjustment method described in Patent Document 1. If the modulation characteristics are changed by a variation of the modulation, therefore, the optimum write power is calculated assuming that the variation is correct.

Variations represented by FIG. 1 relate to positions of measurement points on the optical disc, and there are no correlations at individual measurement points. As a simple method for removing the influence shown in FIG. 1, therefore, a method of increasing the measurement points sufficiently in the range in which write power adjustment is conducted is considerable. However, the trial writing area in the actual optical disc is finite. If a large amount of measurement points are used in the trial writing to conduct write power adjustment one time, then ensuing write power adjustment cannot be executed. Therefore, a method that makes it possible to execute the write power adjustment with high precision by using an amount of trial writing that is approximately equal to that in the existing circumstances is desired.

The present invention provides a write power adjustment method which makes it possible to solve the above-described problems and determine the optimum write power with high precision, and an information write method and an optical information write medium for writing information with power adjusted by using the adjustment method.

In order to solve the problems, in write power adjustment according to the present invention, optimum write power Pw-opt is determined by writing a predetermined signal by using write power Pw,m (where m is an integer) of a plurality of kinds, reading the written signal, thereby acquiring a modulation M,m associated with each write power Pw,m, fitting Formula (1) to a measured relation between the write power Pw,m and the modulation M,m, calculating optimum values of a saturated modulation Msat, write start power Pws and asymptotic power Pasy, and conducting predetermined computation on a calculated optimum write start power Pws-opt.

$$M = M_{sat}\left(1 - \frac{P_{ws} - P_{asy}}{P_w - P_{asy}}\right) \quad (1)$$

FIG. 5 is a schematic diagram showing relations among a measured relation (modulation characteristics) between the write power Pw and the modulation M, the function of Formula (1) obtained as a result of fitting, an optimum saturated modulation Mat-opt, optimum asymptotic power Pasy-opt, optimum write start power Pws-opt, and optimum write power Pw-opt. Here, a saturated modulation Msat is an asymptotic value of the modulation in Formula (1), and a saturated value of the modulation expected from the measured modulation characteristics. The asymptotic power Pasy is an asymptotic value of the write power obtained when the modulation is ±infinite in Formula (1). In addition, the write start power Pws is write power obtained when the modulation becomes zero in Formula (1), i.e., an intersection of Formula (1) and the write power axis, and it is power at which writing is started expected from the measured modulation characteristics. In this way, Formula (1) represents the modulation characteristics by using a function characterized by the saturated modulation Msat, the write start power Pws, and the asymptotic power Pasy.

In the write power adjustment method according to the present invention, fitting is conducted accurately on the measured modulation characteristics by using Formula (1). Since variations at measurement points shown in FIG. 1 are thus averaged, high precision write power adjustment is implemented. Furthermore, in the present write power adjustment method, the optimum write power Pw-opt is calculated from the optimum write start power Pws-opt. Finding thus accurately the power at which writing is started and determining the optimum power on the basis of the power is equivalent to calculating accurately energy with which the information write medium is irradiated. In the write power adjustment method according to the present invention, therefore, accurate calculation of the optimum write start power Pws-opt also implements high precision write power adjustment.

According to the write power adjustment method in the present invention, adjustment of the optimum write power can be conducted with high precision in an optical disc in which the relation between the write power and the modulation varies irregularly.

Other objects, features and advantages of the invention will become apparent from the following description of the embodiments of the invention taken in conjunction with the accompanying drawings.

DETAILED DESCRIPTION OF THE EMBODIMENTS

Hereafter, a write power adjustment method according to an embodiment of the present invention will be described with reference to the drawings.

In the present embodiment, an optical disc is used as an information write medium and an optical disc apparatus is used as an information write-read apparatus. After describing configurations of them, a write power adjustment method according to the present embodiment used in the optical disc apparatus functioning as the information write-read apparatus will be described.

Figure 1:
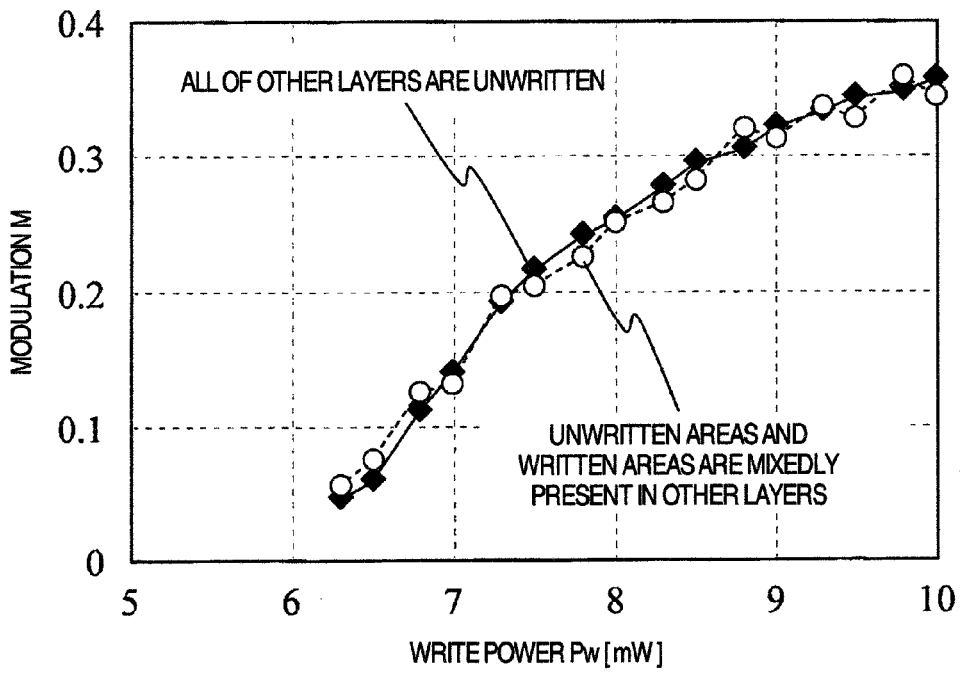
FIG. 1 is an exemplifying diagram showing that a relation (modulation characteristics) between write power Pw and modulation M varies when areas in the unwritten state and areas in the written state are mixedly present in other layers, in trial writing in a multi-layer optical disc.
Figure 2:
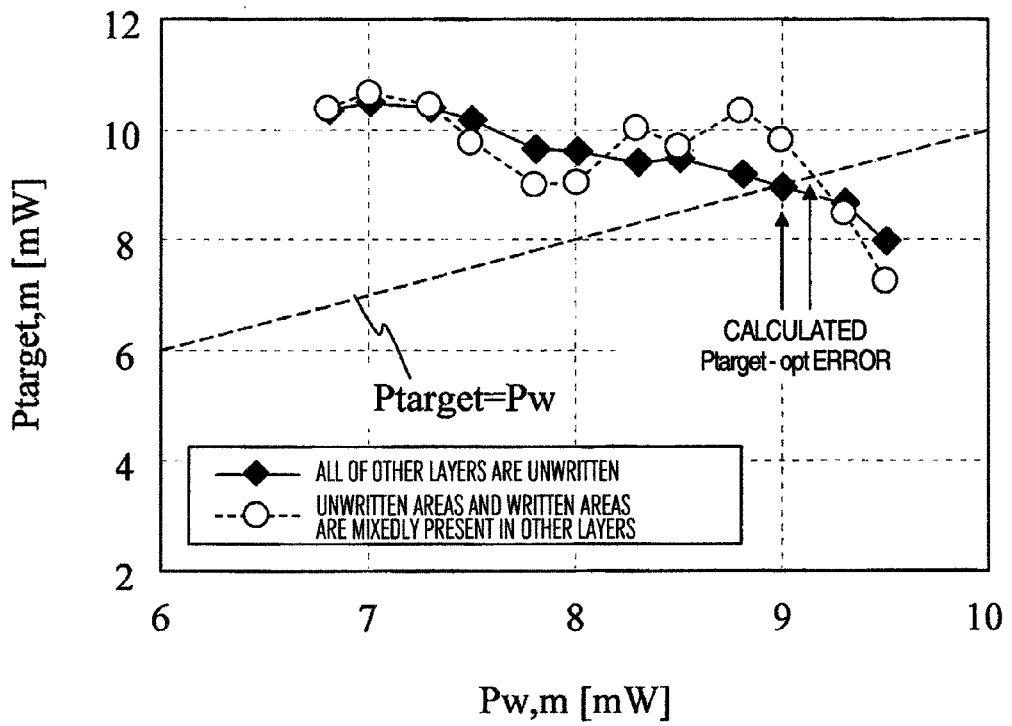
FIG. 2 is an exemplifying diagram showing that an error occurs in optimum target write power calculated in write power adjustment of the κ scheme when modulation characteristics vary.

The optical disc used in the embodiment is the four-layer optical disc used in FIG. 1, and it is an optical disc in which the variation of the modulation characteristics shown in FIG. 1 and described as the problem occurs. Write power adjustment in each embodiment is conducted in the state in which unwritten areas and written areas are mixedly present in other layers of the optical disc. In other words, modulation characteristics in each write power adjustment has greater variations in modulation as compared with the case where all of other layers are unwritten, as shown in FIG. 1.

EMBODIMENTS

First Embodiment

Figure 6:
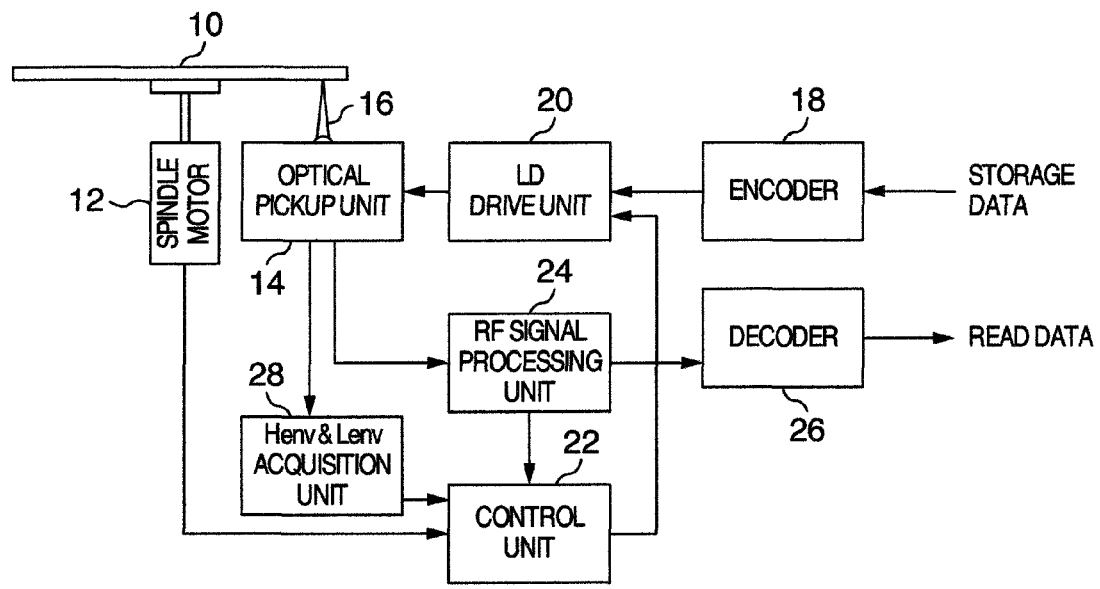
FIG. 6 is an exemplifying block diagram showing a configuration of a principal part of an optical disc apparatus according to an embodiment of the present invention.

FIG. 6 is a block diagram showing a configuration of a principal part of the optical disc apparatus used in the embodiments of the present invention.

An optical disc 10 is subject to CLV (Constant Linear Velocity) control or CAV (Constant Angular Velocity) exercised by a spindle motor 12. An optical pickup unit 14 is provided so as to be opposed to the optical disc 10. The optical pickup unit writes a signal in the optical disc 10 by emitting laser light 16 having write power from a laser diode (LD), and reads a written signal by emitting laser light having read power from the LD. In addition, if the optical disc 10 is a rewritable optical disc, then laser light having erase power (read power<erase power<write power) is emitted from the LD to erase the written signal. A signal is written by causing an irreversible change in a material of a write film of the optical disc 10 with laser light having write power and thereby forming pits in a case, or by heating and then quenching a write film in the crystal state and thereby changing the write film into the amorphous state in another case. In the present embodiment, either write method can be used. In the latter case, erasing is conducted by returning the amorphous state to the crystal state as a result of irradiation with laser light having erase power.

When writing a signal, the write signal is encoded by an encoder 18 and supplied to an LD drive unit 20. The LD drive unit 20 generates a drive signal on the basis of the encoded write signal, supplies the drive signal to the LD in the optical pickup unit 14, and writes the signal. A write power value in the LD drive unit 20 is determined by a control signal supplied from a control unit 22. Prior to writing a signal, the control unit 22 conducts trial writing by using write power of a plurality of kinds in a trial write area in the optical disc 10, and determines optimum write power on the basis of a signal quality of the trial writing.

On the other hand, when reading data, an RF signal output from the optical pickup unit 14 is supplied to an RF signal processing unit 24. The RF signal processing unit 24 includes an RF amplifier, an equalizer, a binarizing part, and a PLL part, conducts processing on the RF signal by using them, and supplies a resultant signal to a decoder 26. The decoder 26 decodes the signal on the basis of the binarized RF signal and a synchronizing clock read by the PLL part, and outputs the decoded signal as read data. A Henv & Lenv acquisition unit 28 amplifies the read signal which is output from the optical pickup unit 14, then calculates a higher envelope curve (Henv) and a lower envelope curve (Lenv) of the read signal, and supplies them to the control unit 22 as signals for signal quality evaluation. The read RF signal supplied from the RF signal processing unit 24 which is an RF signal acquisition system is also amplified and then supplied to the control unit 22 as a signal for signal quality evaluation. As circuits used at the time of data reading and writing, there are besides a circuit for generating a tracking error signal and a focus error signal and controlling the focus servo and tracking servo, and a circuit for reading a wobble signal formed in the optical disc 10 and using the wobble signal for address demodulation or rotation speed control. Since those circuits are the same as those in the conventional art, however, description of them will be omitted.

The control unit 22 determines optimum write power on the basis of the read signal quality of trial writing supplied from the RF signal processing unit or the Henv & Lenv acquisition unit. In other words, the control unit 22 calculates a modulation M on the basis of the signal supplied from the RF signal processing unit or the Henv & Lenv acquisition unit, determines optimum write power Pw-opt on the basis of optimum write start power Pws-opt obtained when Formula (1) is fitted to relations between write power Pw,m of a plurality of kinds and the corresponding modulation M,m, and supplies the optimum write power Pw-opt to the LD drive unit 20.

Figure 7:
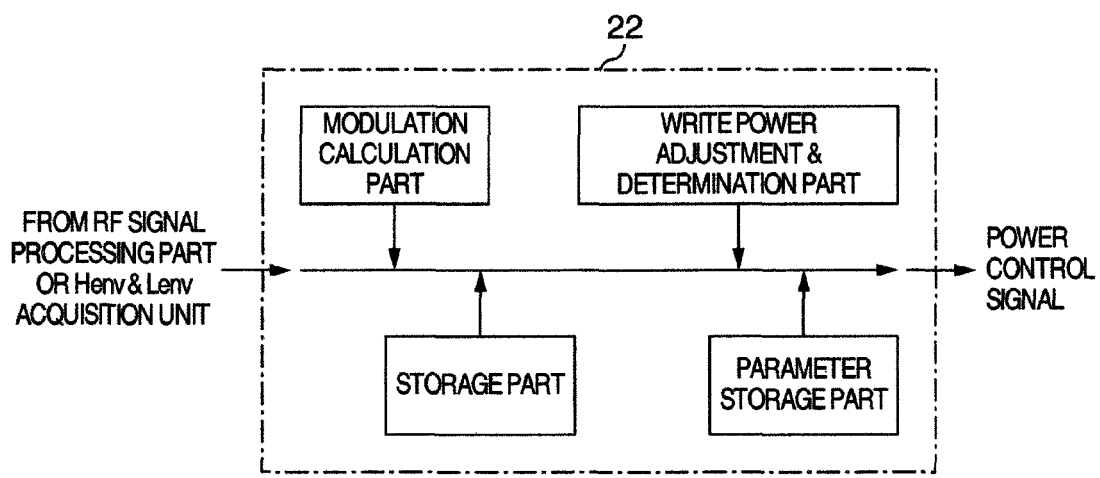
FIG. 7 is an exemplifying block diagram showing a control unit in the optical disc apparatus according to the embodiment of the present invention.

FIG. 7 is a block diagram showing a configuration of the control unit 22 shown in FIG. 6.

The control unit 22 is specifically constituted by a microcomputer. The control unit 22 includes a modulation calculation part, a write power adjustment & determination part, a storage part, and a parameter storage part. The modulation calculation part and the write power adjustment & determination part can be specifically constituted by a single CPU, and the storage part and the parameter storage part can be constituted by a RAM.

The control unit 22 is supplied with a signal from the RF signal processing unit or the Henv & Lenv acquisition unit via an interface which is not illustrated. The signal is input to the modulation calculation part. The modulation calculation part calculates the modulation M on the basis of the supplied signal. In the write power adjustment, the calculated modulation M,m is stored in the storage unit so as to be associated with each write power Pw,m. The write power adjustment & determination part determines the optimum write start power Pws-opt obtained when fitting Formula (1) is fitted to the relation between write power Pw,m and modulation M,m, which is stored modulation characteristics, with, and determines the optimum write power Pw-opt by performing predetermined computation using the optimum write start power Pws-opt.

Hereafter, a result obtained by conducting the write power adjustment by using the optical disc apparatus will be described.

First, the control unit 22 sets write power Pw,m of a plurality of kinds in accordance with predetermined conditions. For example, the control unit 22 reads out average optimum write power in the optical disc previously stored in an optical write-read apparatus or reads out average optimum write power written in an information control area of the optical disc, and sets write power Pw,m of a plurality of kinds on the basis of the average optimum write power. The control unit writes a signal of a predetermined pattern such as a repetitive pattern of marks and spaces of a longest signal used in the optical disc in a predetermined area of the optical disc such as a trial write area of the optical disc by using the set Pw,m.

The higher envelope curve (Henv, m) and lower envelope curve (Lenv, m) of the read signal amplitude are measured by reading a signal written with each Pw,m. And the modulation M,m associated with each write power Pw,m is calculated by computing M,m=(Henv,m−Lenv,m)/Henv,m. The calculated modulation M,m is associated with the write power Pw,m and stored in the storage part shown in FIG. 7.

Then, the write power adjustment & determination part shown in FIG. 7 fits Formula (1) to the measured relation between the write power Pw,m and the modulation M,m, and determines optimum values Msat-opt, Pws-opt and Pasy-opt of the parameters in Formula (1). As for the fitting, for example, the parameters Msat, Pws and Pasy in Formula (1) are changed independently. The optimum values Msat-opt, Pws-opt and Pasy-opt of the parameters are determined so as to minimize the error between Formula (1) and measurement points (Pw,m, M,m) by using, for example, the least square method.

Then, the optical disc apparatus reads out and acquires a ratio $\tau$=Pw-opt/Pws-opt between the optimum write power Pw-opt and the optimum write start power Pws-opt of the optical disc stored previously in the storage part in the optical disc apparatus, or reads out and acquires a ratio $\tau$=Pw-opt/Pws-opt between the optimum write power Pw-opt and the optimum write start power Pws-opt of the optical disc stored previously in a management area of an optical disc. Then, the optical disc apparatus calculates the optimum write power Pw-opt by using the relation Pw-opt=$\tau$×Pws-opt.

Figure 3:
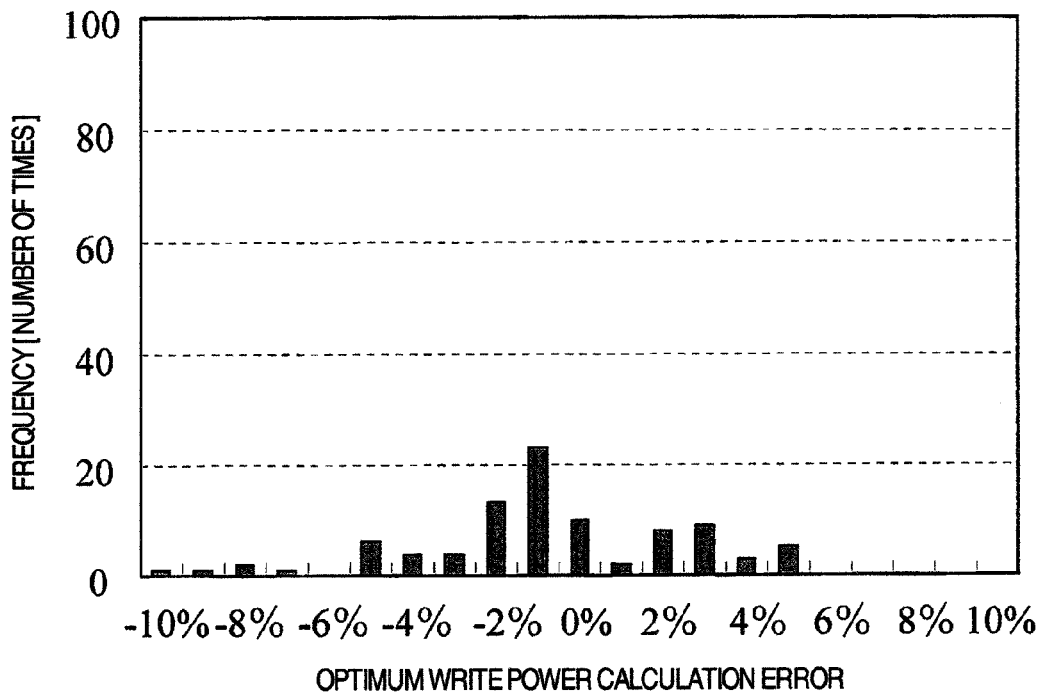
FIG. 3 is an exemplifying diagram showing a relation between an error of the calculated optimum write power and frequency obtained when write power adjustment of the κ scheme has been executed one hundred times in an optical disc which varies in modulation characteristics.
Figure 4:
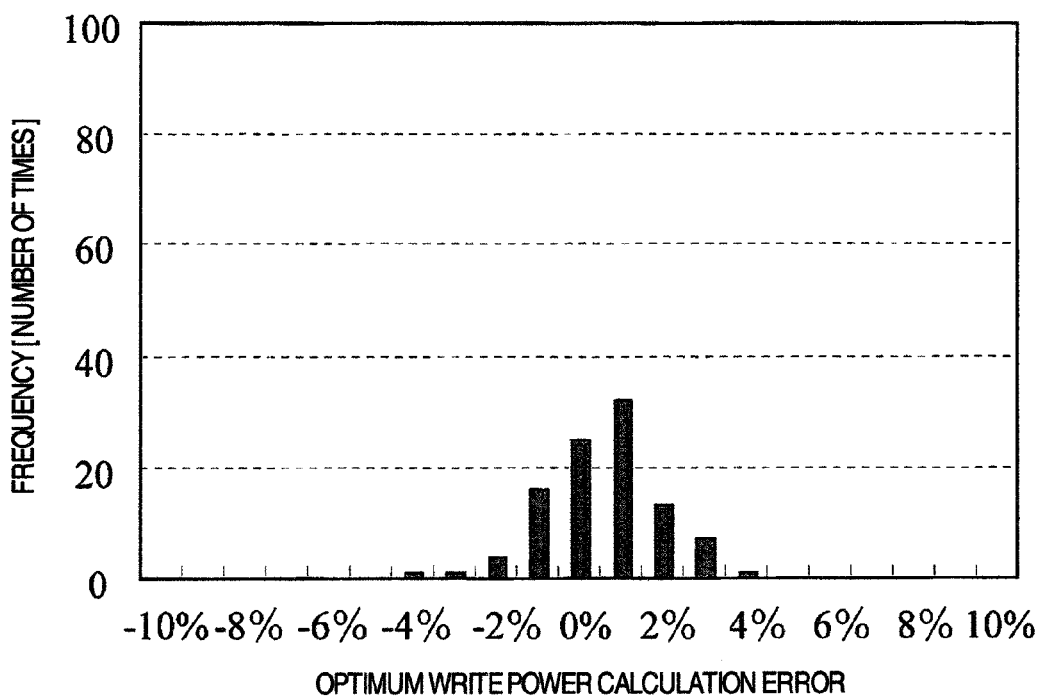
FIG. 4 is an exemplifying diagram showing a relation between an error of the calculated optimum write power and frequency obtained when write power adjustment described in Patent Document 1 has been executed one hundred times in an optical disc which varies in modulation characteristics.
Figure 5:
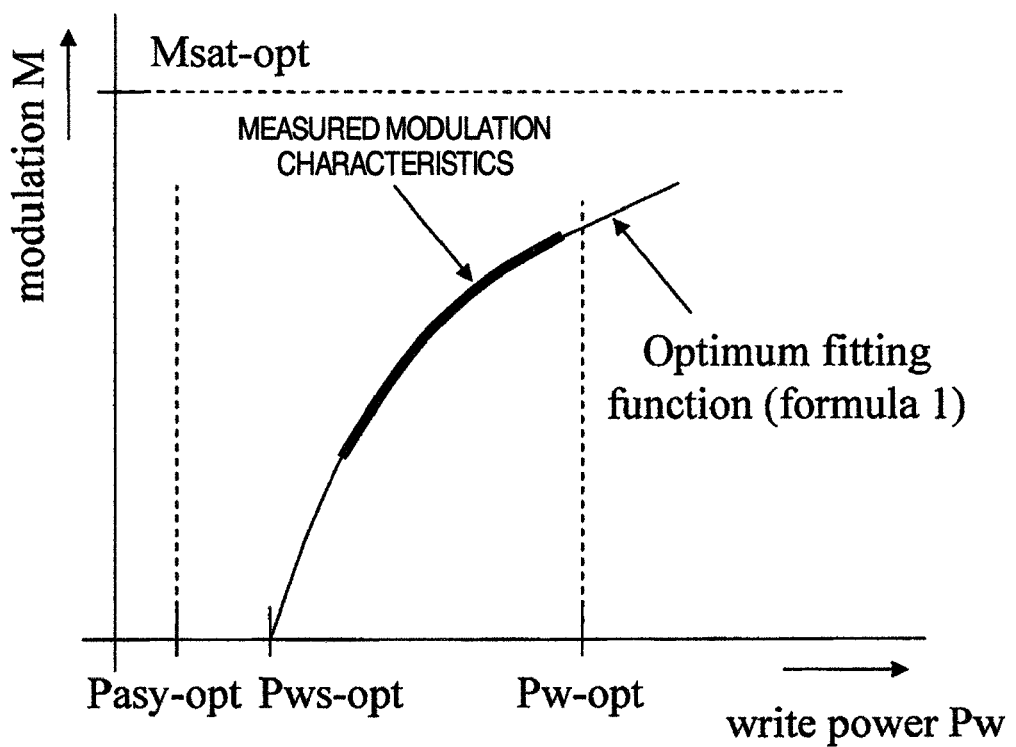
FIG. 5 is an exemplifying diagram for explaining parameters in Formula (1) at the time when Formula (1) according to the present invention is fitted to modulation characteristics.
Figure 8:
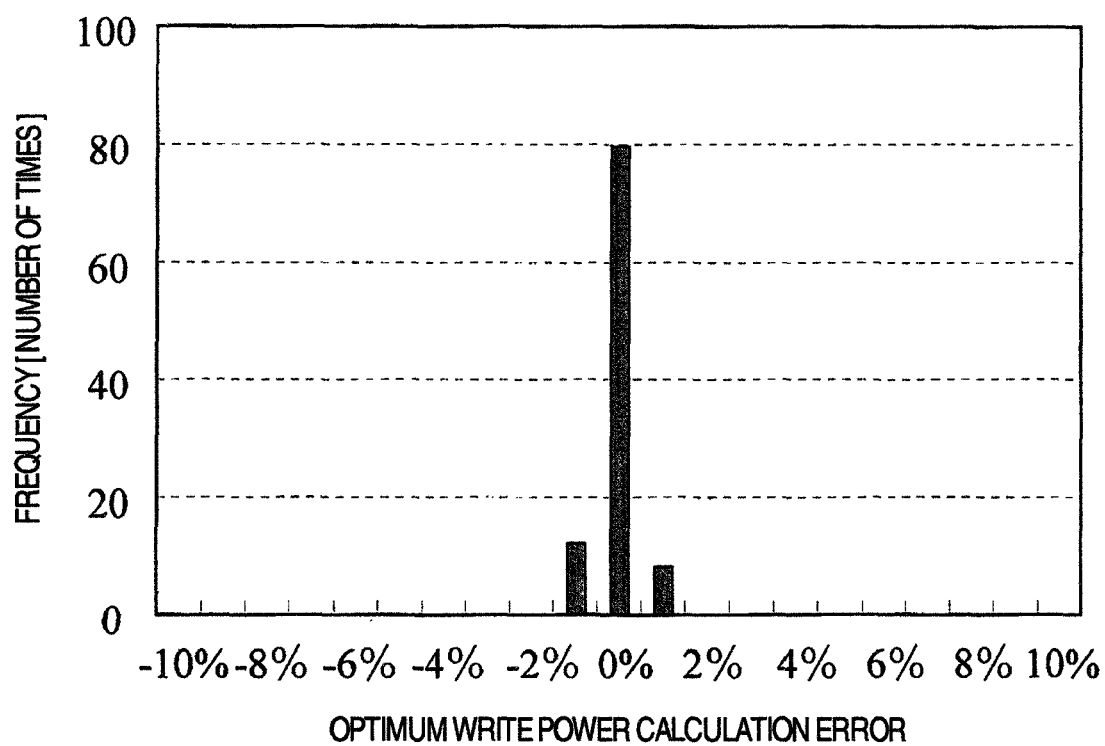
FIG. 8 is an exemplifying diagram showing a relation between an error of the calculated optimum write power and frequency obtained when write power adjustment according to the present invention has been executed one hundred times in an optical disc which varies in modulation characteristics.

FIG. 8 shows the calculation precision of the optimum write power Pw-opt at the time when write power adjustment has been conducted one hundred times by using the above-described write power adjustment method. As compared with FIGS. 3 and 4, the calculation errors become small and the frequency becomes the highest at the calculation error of 0%. Therefore, it can be confirmed that the variations of the modulation characteristics shown in FIG. 1 can be suppressed and the write power adjustment can be executed accurately by using the write power adjustment according to the present invention. In the write power adjustment method according to the present invention, variations at measurement points shown in FIG. 1 are averaged at all measurement points used in the write power adjustment by fitting Formula (1) to the measured modulation characteristics. This indicates that sufficiently irregular variations can be averaged by using only measurement points under the present circumstances without increasing the number of the measurement points of the trial writing. As appreciated from the foregoing description, it is possible to reduce the influence of variations of the effective write power and variations of the modulation at the time of reading depending upon the position of the measurement point and implement high precision write power adjustment by using the write power adjustment method according to the present invention.

The ratio $\tau$(=Pw-opt/Pws-opt) between the optimum write power Pw-opt and the optimum write start power Pws-opt of the optical disc utilized here is a value inherent in the information write medium such as the optical disc, and it is a value determined for, for example, each classification of optical discs. It suffices that the ratio $\tau$ is previously written on the disc when manufacturing the disc, such as, for example, when fabricating the substrate. For example, in the case of a BD, the $\kappa$ value which is a value inherent in the disc is stored in wobbles together with address information and so on at the time of manufacture of the disc. As for $\tau$ as well, therefore, it suffices that $\tau$ is written in the disc in the same way. If $\tau$ is not written in information retained by the disc, $\tau$ may be calculated on the basis of relevant information. Or considering that $\tau$ is a value determined for each classification of optical discs, if the value of $\tau$ associated with the classification of the optical disc which can be considered (which can exist) is predicted and the optical disc apparatus has data concerning it, then the optical disc apparatus may determine $\tau$ according to the classification of the optical disc.

As heretofore described, the control unit 22 finishes the write power adjustment and conducts writing on the write disc by using the determined optimum write power Popt. It is confirmed that writing can be conducted suitably as a result.

Second Embodiment

In the present embodiment, the case where the method for setting the write power Pw,m of a plurality of kinds in the first embodiment is changed will be described. Since unchanged parts are the same as those in the first embodiment, description of them will be omitted in the present embodiment.

Setting of write power Pw,m of a plurality of kinds is conducted by, for example, previously reading out a range for setting write power of trial writing written in the management area of the optical disc and/or stored in the storage part of the optical disc apparatus. Furthermore, setting of write power Pw,m is also possible by, for example, reading out the indicated write power Pind used in the write power adjustment method of the $\kappa$ scheme and setting write power Pw,m of the trial writing in the same way as the $\kappa$ scheme.

In any case, the write power Pw,m is set suitably. In the same way as the first embodiment, therefore, the write power adjustment can be executed.

Third Embodiment

In the present embodiment, the case where the signal written by using the write power Pw,m in the first embodiment is changed will be described. Since unchanged parts are the same as those in the first embodiment, description of them will be omitted in the present embodiment.

For example, a random pattern of a modulation code or an isolated signal pattern in the optical disc can be used in a signal to be written by using the write power Pw,m. Furthermore, it is also possible to use a pattern containing a signal which is longer than the longest signal of the modulation code in the optical disc. This pattern is longer than the longest code used in the user data area. For example, in the BD, the 1-7 modulation is used. Therefore, the 9T continuous pattern which violates the 1-7 modulation rule corresponds to the pattern. In any case, modulation characteristics in the medium can be acquired if the signal has the same pattern at all write power Pw,m. Therefore, write power adjustment similar to that in the first embodiment can be conducted.

If a pattern containing a signal which is longer than the longest signal of the modulation code in the optical disc is used, the precision of the write power adjustment is improved in some cases. This is because the reliability for data having the modulation used in the write power adjustment is raised by conducting trial writing using a signal longer than the longest signal, in the case of a disc using a signal in which the mark or space level of the longest signal does not become a saturation level.

Fourth Embodiment

In the present embodiment, the case where the fitting method for the measured modulation characteristics in the first embodiment is changed will be described. Since unchanged parts are the same as those in the first embodiment, description of them will be omitted in the present embodiment.

In the present embodiment, the parameter optimum values Msat-opt, Pws-opt and Pasy-opt are determined by previously acquiring reference asymptotic power Pasy-ref and reference write start power Pws-ref determined previously for each medium from the management area of the optical disc or the storage part in the optical disc apparatus and fitting Formula (1) to measured modulation characteristics on the basis of the acquired information.

The reference asymptotic power Pasy-ref and reference write start power Pws-ref predetermined for each medium are parameters inherent in the optical disc. They are previously determined by using a method described below.

In a state of the optical disc to be referred to, such as, for example, in a state in which all of other layers in a multi-layer optical disc are unwritten, trial writing is conducted in a range of write power in which write power adjustment is executed and reference modulation characteristics are acquired. Parameter optimum values Msat-opt, Pws-opt and Pasy-opt are determined by fitting Formula (1) to the acquired modulation characteristics, such as, for example, by changing the parameters Msat, Pws and Pasy in Formula (1) independently and using the least square method so as to minimize the error between the reference modulation characteristics and Formula (1). The determined optimum write start power Pws-opt is determined as reference write start power Pws-ref. The determined optimum asymptotic power Pasy-opt is determined as reference asymptotic power Pasy-ref.

Figure 9:
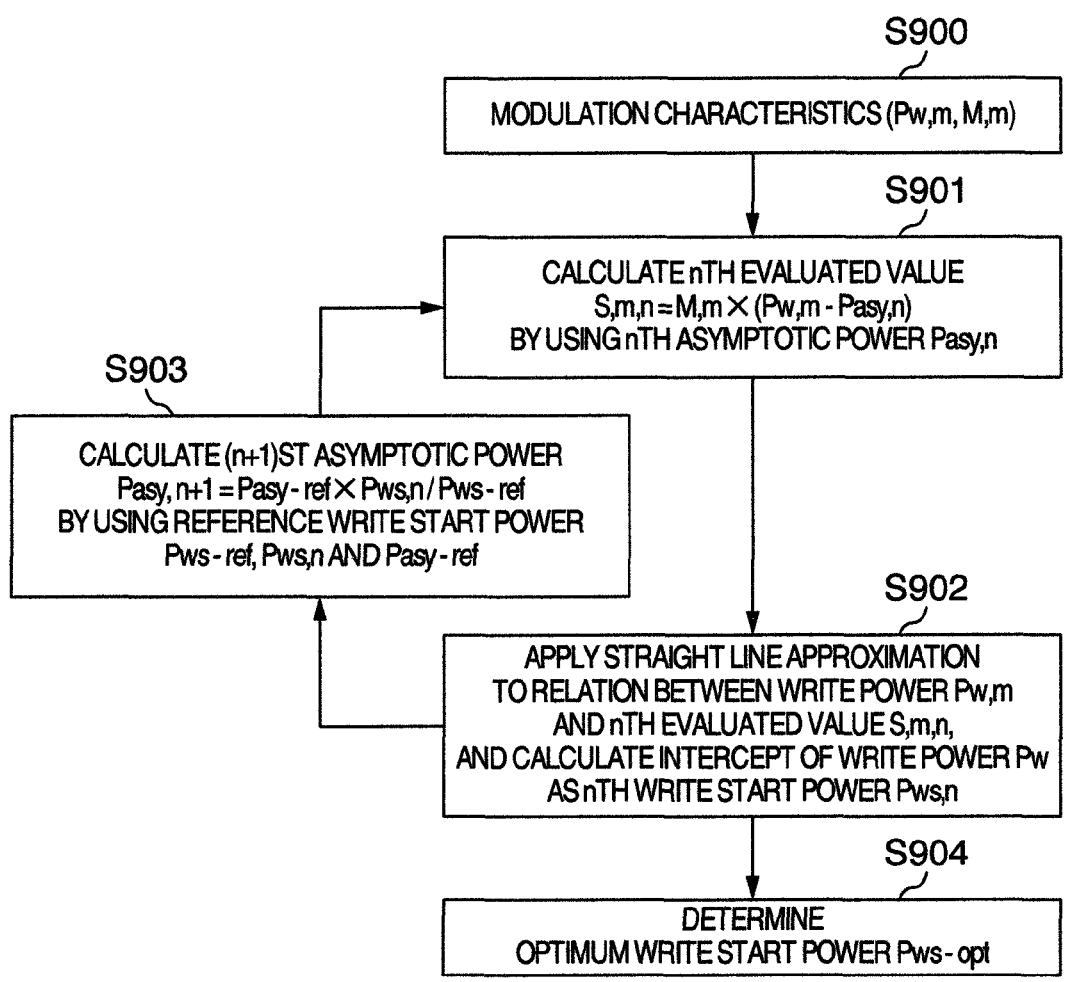
FIG. 9 is a flow chart showing a procedure for determining optimum write start power Pws-opt on the basis of modulation characteristics measured by using reference asymptotic power Pasy-ref and reference write start power Pws-ref, in write power adjustment method according to the present invention.

The method for determining the parameter optimum values Msat-opt, Pws-opt and Pasy-opt by fitting Formula (1) to the measured modulation characteristics by use of the reference asymptotic power Pasy-ref and the reference write start power Pws-ref will now be described with reference to a flow shown in FIG. 9.

With respect to a measurement point (Pw,m, M,m) of the measured modulation characteristics, first, the reference asymptotic power Pasy-ref is set as first asymptotic power Pasy,1. At S901, a first evaluated value $S,m,1=M,m \times (Pw,m-Pasy,1)$ is calculated by using the first asymptotic power Pasy,1. Then, at S902, write power Pw that makes the first evaluated value S,1 equal to zero when the relation between the write power Pw,m and the first evaluated value S,m,1 is subject to straight line approximation is calculated as first write start power Pws,1. Then, at 5903, second asymptotic power Pasy,2 is calculated by using the relation $Pasy,2=Pasy-ref \times Pws,1/Pws-ref$ and the calculated first write start power Pws,1 and reference write start power Pws-ref. In the present fitting scheme, the fitting precision is improved and the optimum write power Pw-opt is calculated with high precision by repeating the processing in the calculation loop S903–S901–S902.

Figure 10:
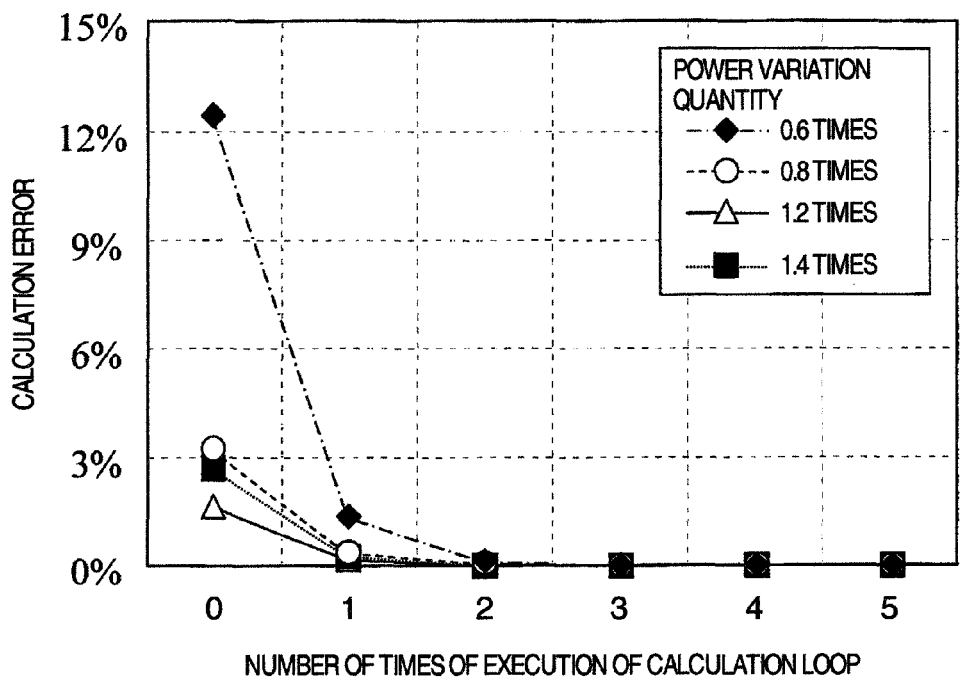
FIG. 10 is an exemplifying diagram showing relations between the number N of times of calculation loop and an error of calculated optimum write power in a write power adjustment method for calculating optimum write power by using the reference asymptotic power Pasy-ref and the reference write start power Pws-ref.

FIG. 10 shows relations between the number N (where N≧0) of times of repetitive execution of the calculation loop and the calculation error of the optimum write power. The case where the variation quantity in the write power Pw direction of modulation characteristics which is measured in the write power adjustment is in the range of 0.6 times to 1.4 times as compared with the reference modulation characteristics is shown in FIG. 10. Even for power variation of 0.6 times that maximizes the calculation error when the number of times of execution of the calculation loop is 0, the calculation error becomes 1% or less when the number of times of execution of the calculation loop is two. In the present embodiment, therefore, the number of times of execution of the calculation loop is set equal to two. After the processing of the calculation loop is conducted twice, third write start power Pws,3 is calculated at S902 and the third write start power Pws,3 is determined as the optimum write start power Pws-opt at S904.

Although the saturated modulation Msat is not mentioned, a slope in straight line approximation for a relation between write power Pw,m and a third evaluated value S,m,3 at the time when determining the third write power Pws,3 is equivalent to Msat. It is optimized at the time of straight line approximation, and calculation from it is possible as occasion demands. As heretofore described, fitting to the measured modulation characteristics and determination of optimum values of the parameters in Formula (1) are conducted.

According to the procedure heretofore described, the nth asymptotic power Pasy,n is used, the nth write start power Pws,n is calculated from a result obtained by applying straight line approximation to the write power and the evaluated value, and the (n+1) asymptotic power Pasy,n+1 is calculated using the relation $Pasy,n+1=Pasy-ref \times Pws,n/Pws-ref$. This relation can be rewritten as $Pasy,n+1/Pws,n=Pasy-ref/Pws-ref$. Therefore, repeating the calculation of the asymptotic power Pasy is equivalent to correcting parameters so as to cause the ratio between the asymptotic power Pasy and the write start power Pws to approach the ratio between Pasy-ref and Pws-ref in the reference modulation characteristics. Therefore, this method is equivalent to conducting fitting so as to cause the ratio between the write start power Pws and the asymptotic power Pasy to coincide with the ratio between the reference write start power Pws-ref and the reference asymptotic power Pasy-ref while correcting the asymptotic power Pasy, by utilizing that the modulation characteristics acquired by the trial writing take the same curve shape as those of the reference modulation characteristics. After the parameter correction is repeated sufficiently, therefore, the parameters Msat, Pasy and Pws converge to the optimum values. By thus placing restrictions on the function shape beforehand at the time of fitting, it can be prevented to fit a function having an erroneous shape and calculate erroneous optimum write power. Furthermore, in this method, the operation of swinging the parameters Msat, Pws and Pasy in Formula (1) to look for optimum values is not included, but repetition of the same operation suffices. Therefore, this method makes it possible to execute high precision write power adjustment with a simple configuration.

Figure 11:
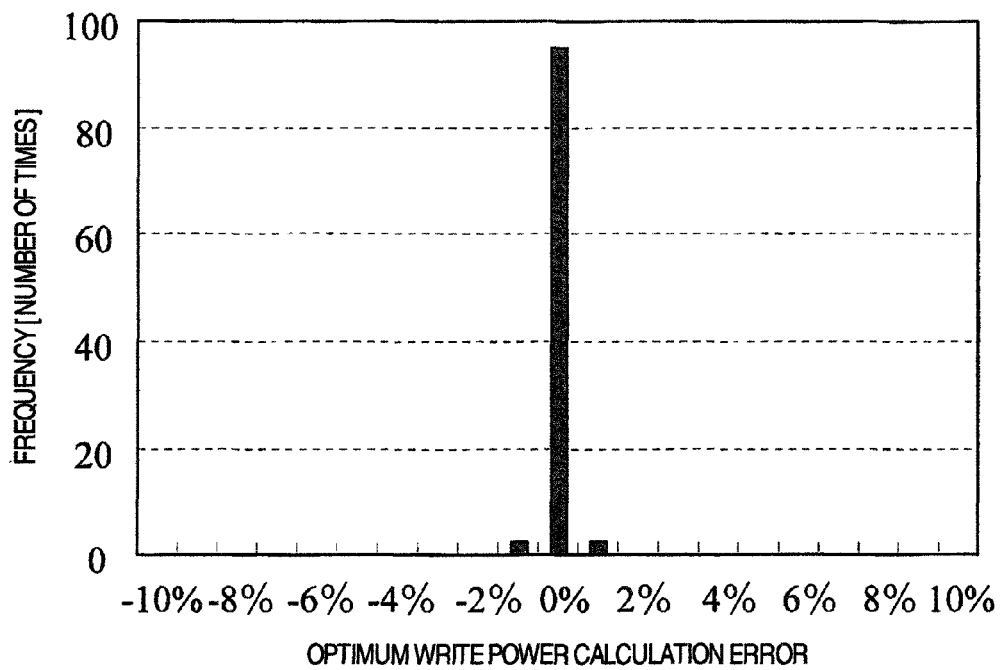
FIG. 11 is an exemplifying diagram showing a relation between an error of calculated optimum write power and frequency obtained when write power adjustment using the reference asymptotic power Pasy-ref and the reference write start power Pws-ref according to the present invention has been conducted one hundred times in an optical disc which varies in modulation characteristics.

FIG. 11 shows the calculation precision of the optimum write power Pw-opt obtained by conducting write power adjustment using the write power adjustment method according to the present embodiment one hundred times. As compared with FIG. 8, the calculation error becomes further small. Therefore, it can be confirmed that the optimum write power can be calculated with further high precision in the write power adjustment method according to the present embodiment as compared with the procedure used in FIG. 8, by previously fixing features of the modulation characteristics of the optical disc and conducting fitting.

In the present embodiment, correction of Pasy is conducted by executing the processing of the calculation loop S903–S901–S902 twice. As appreciated from the result shown in FIG. 10, however, the optimum write power is calculated with sufficiently high precision even if the optimum write power is calculated with the number of times of execution of the calculation loop being set equal to zero (without conducting the correction of Pasy) as long as power variations are small. This indicates that the first write start power Pws,1 calculated by regarding the reference asymptotic power Pasy-ref as the first asymptotic power Pasy coincides with the optimum write start power Pws-opt. Therefore, write power adjustment method without Pasy correction is also possible. As a result, it becomes possible to implement the write power adjustment operation with a further simple configuration, and in addition, the reference write start power Pws-ref becomes unnecessary.

Fifth Embodiment

In the present embodiment, the case where the fitting method for the measured modulation characteristics in the first embodiment is changed will be described. A fitting method used in the present embodiment is a method which is different from that in the fourth embodiment. Since unchanged parts are the same as those in the first embodiment, description of them will be omitted in the present embodiment.

In the present embodiment, the optimum values Msat-opt, Pws-opt and Pasy-opt of the parameters are determined by previously acquiring a ratio v=Pws-opt/Pasy-opt between the optimum write start power Pws-opt and the optimum asymptotic power Pasy-opt previously determined for each medium from the management area of the optical disc and/or the storage part in the optical disc apparatus, and fitting Formula (1) to measured modulation characteristics on the basis of the acquired information.

The ratio v determined previously for each medium is a parameter inherent in the optical disc. In the same way as the calculation of the parameters inherent in the optical disc in the fourth embodiment, therefore, the ratio v is determined as the ratio v=Pws-opt/Pasy-opt between the optimum write start power Pws-opt and the optimum asymptotic power Pasy-opt which are calculated by using the reference modulation characteristics of the optical disc.

Hereafter, a method for determining the optimum values Msat-opt, Pws-opt and Pasy-opt of the parameters by fitting Formula (1) to the modulation characteristics measured by using the ratio v between Pws and Pasy with will be described.

Each measurement point (Pw,m, M,m) of measured modulation characteristics is substituted into Formula (1). Pws is eliminated by using v at this time. As a result, Formula (2) is obtained.

$$M_{,m}\left(\frac{P_{w,m} - P_{asy}}{P_{w,m} - vP_{asy}}\right) = M_{sat} \quad (2)$$

The right side Msat is constant. If Pasy is determined so as to make the left side of Formula (2) closest to constant, therefore, the average value of the right side at that time is determined as the optimum saturated modulation Msat-opt and v×Pasy-opt is determined as the optimum write start power Pws-opt. As a result of determining Pws-opt by using this method, the calculation error obtained when write power adjustment is conducted one hundred times is small in the same way as the fourth embodiment. Thus it has been confirmed that high precision write power adjustment can be executed.

In this way, the ratio v between Pws and Pasy is made constant in the present write power adjustment method. Therefore, fitting is conducted supposing that the measured modulation characteristics and the reference modulation characteristics have the same curve shape in the same way as the preceding write power adjustment method. In the same way as the write power adjustment method according to the fourth embodiment, therefore, it is prevented to fit an erroneous function and high precision write power adjustment is implemented under the modulation variations shown in FIG. 1. Furthermore, three parameters in Formula (1) are reduced to two by giving the ratio v between Pws and Pasy and conducting fitting. In addition, Pasy can be retrieved so as to make the left side of Formula (2) constant. Therefore, it suffices to retrieve an optimum value of one parameter in this method. According to this method, therefore, high precision write power adjustment can be executed with a simple configuration.

Sixth Embodiment

In the present embodiment, the case where the method for determining parameters inherent in the medium, such as, for example, Pws-ref, Pasy-ref and v, used in fitting in the fourth or fifth embodiment has been changed will be described. Since unchanged parts are the same as those in the fourth or fifth embodiment, description of them will be omitted in the present embodiment.

With respect to the measurement point (Pw,m, M,m) of the reference modulation characteristics, an evaluated value M,m×(Pw,m−Pasy) having the asymptotic power Pasy as a variable is considered. Pasy that minimizes the error between the write power Pw,m versus the evaluated value relation and the approximating straight line is calculated. For example, Pasy that minimizes the square error sum is calculated. The calculated Pasy is determined as the optimum asymptotic power Pasy-opt. When the evaluated value M,m×(Pw,m−Pasy-opt) using Pasy-opt and the write power Pw,m are subjected to straight line approximation, the value of the write power Pw that makes the evaluated value equal to zero is determined as the optimum write start power Pws-opt.

The parameter values inherent in the medium determined by using this method are the same as those in the fourth or fifth embodiment. In the same way as the fourth or fifth embodiment, therefore, parameters to be used in the fitting in the write power adjustment can be given suitably.

Seventh Embodiment

In the present embodiment, the case where the state of the optical disc used as reference when determining the parameters inherent in the medium in the fourth or fifth embodiment is changed will be described. Since unchanged parts are the same as those in the fourth or fifth embodiment, description of them will be omitted in the present embodiment.

In the present embodiment, values of parameters inherent in the medium are determined by using the state in which unwritten areas and written areas are mixedly present in other layers as the reference state of the optical disc. In the state of the optical disc used as reference in the present embodiment, parameter values are calculated by acquiring reference modulation characteristics and fitting Formula (1) to the reference modulation characteristics in the same way as the fourth or fifth embodiment. As a result, Pws-ref and Pasy-ref in the fourth embodiment assume different values. As for v in the fifth embodiment, however, the same value is calculated. The ratio v is the ratio between Pws-ref and Pasy-ref. A parameter which determines the curve shape of modulation characteristics inherent in the medium is a write power ratio between two points determined on the modulation characteristics represented by v. It is indicated that this ratio is constant even if the reference modulation characteristics change, as long as the medium is the same.

As a result of write power adjustment conducted by using the calculated Pws-ref, Pasy-ref and v and using the fitting method in the fourth or fifth embodiment, results similar to those in the fourth or fifth embodiment are obtained. It is thus appreciated that the write power adjustment can be executed accurately even when the reference modulation characteristics are changed and parameters inherent in the medium are calculated.

Eighth Embodiment

In the present embodiment, the case where the method for calculating the optimum write power Pw-opt on the basis of the optimum write start power Pws-opt in the first embodiment is changed will be described. Since unchanged parts are the same as those in the first embodiment, description of them will be omitted in the present embodiment.

For example, if the coefficient ρ in the write power adjustment method of the κ scheme and the ratio τ' between the optimum target write power Ptarget-opt and the optimum write start power Pws-opt are previously acquired, then the optimum write power Pw-opt is calculated by using the relation Pw-opt=ρ×τ'×Pws-opt.

Furthermore, for example, if the reference write start power Pws-ref and reference optimum write power Pw-opt-ref are previously acquired, then the optimum write power Pw-opt is calculated by using the relation Pw-opt=Pw-opt-ref/Pws-ref×Pws-opt.

Furthermore, for example, if the coefficient ρ in the write power adjustment method of the κ scheme, the indicated write power Pind, and the reference write start power Pws-ref are previously acquired, then the optimum write power Pw-opt is calculated by using the relation Pw-opt=ρ×Pind/Pws-ref×Pws-opt.

In any of the cases described above, the ratio between the optimum write power Pw-opt and the optimum write start power Pws-opt can be obtained from previously acquired parameters by conversion, and the optimum write power Pw-opt can be calculated accurately. As for parameters used to calculate Pw-opt from Pws-opt, therefore, it is appreciated that a combination of parameters from which the ratio between Pw-opt and Pws-opt can be obtained by conversion suffices.

Ninth Embodiment

In the present embodiment, the case where the index of the errors between Formula (1) and the measurement points is changed in calculation of parameters inherent in the medium which are used in fitting in the write power adjustment in the first embodiment and fitting in the write power adjustment in the fourth or fifth embodiment will be described. Since unchanged parts are the same as those in the first, fourth or fifth embodiment, description of them will be omitted in the present embodiment.

As an index of errors which is different from square errors used in the least square method, the sum of distances between Formula (1) and the measurement points, a standard deviation σ, a correlation coefficient r, and a coefficient of determination R2 can be mentioned. Optimum parameter values may be determined by using them so as to, for example, minimize the sum of distances between Formula (1) and the measurement points. Here, it is possible to normalize the write power axis and the modulation axis with maximum values of Pw,m and M,m at the measurement points and determine optimum values of the parameters Msat, Pws and Pasy in Formula (1) so as to minimize the sum of distances between Formula (1) and the measurement points. Furthermore, optimum values of the parameters in Formula (1) may be determined by using, for example, the standard deviation σ, the correlation coefficient r, and/or the coefficient of determination R2 between Formula (1) and the measurement points. Here, the coefficient of determination R2 is represented by the following Formula (3).

The parameter is judged to be an optimum value when the coefficient of determination R2 is closest to unity.

$$R^2 = 1 - \frac{\sum_{m=1}^{n}(M_{,m} - M(P_{w,m}))}{\sum_{m=1}^{n}\left(M_{,m} - \frac{1}{n}\sum_{l=1}^{n}M(P_{w,l})\right)} = r^2 \quad (3)$$

Here, n is the number of measurement points, and M(Pw) is M at Pw,m in Formula (1).

No matter which index is used, the precision of the write power adjustment is not degraded as long as the same index is used. If an index is previously determined, therefore, any index may be used to evaluate the error.

Tenth Embodiment

In the present embodiment, the case where a fitting residual D, which is a parameter inherent in the optical disc, is added to the fitting for calculating the optimum write start power Pws-opt in the first, fourth or fifth embodiment will be described. Since unchanged parts are the same as those in the first, fourth or fifth embodiment, description of them will be omitted in the present embodiment.

The fitting residual D is an index representing the fitting precision at the time when Formula (1) is fitted to the modulation characteristics of the optical disc. The fitting residual D is previously acquired by reading information written in the management area of the optical disc and/or reading information stored in the storage part in the optical disc apparatus. Here, the acquired fitting residual D is an error between the reference modulation characteristics and Formula (1) obtained when Formula (1) is fitted to the reference modulation characteristics. For example, if fitting is conducted by using the least square method, the acquired fitting residual D is a minimum value of the sum of squared errors. This should be found simultaneously when determining parameters inherent in the optical disc which are acquired previously before the write power adjustment in the fourth, fifth, sixth and eleventh embodiments. Depending upon the index of the fitting errors, therefore, the fitting residual D is, for example, the squared error sum, the sum of distances between Formula (1) and measurement points, the standard deviation, the correlation coefficient, or the coefficient of determination.

In the fitting in the write power adjustment, the fitting residual D is compared with, for example, errors obtained when Formula (1) is fitted to the measured modulation characteristics. As a result, it becomes possible to compare the fitting precision of the measured modulation characteristics with that of the reference modulation characteristics, and it can be confirmed whether the fitting is executed suitably.

Furthermore, at the time when the fitting residual D is acquired, a decision can be made to what degree Formula (1) can be fitted to the modulation characteristics of the optical disc. As a result, it becomes possible to discriminate an optical disc to which the write power adjustment method according to the present invention cannot be applied.

Eleventh Embodiment

In the present embodiment, a method for determining parameters used when calculating the optimum write power Pw-opt from the optimum write start power Pws-opt in the first and eighth embodiments, such as, for example, the ratio τ between Pw-opt and Pws-opt and the ratio τ' between Ptarget-opt and Pws-opt will be described.

These parameters are determined by fitting Formula (1) to the reference modulation characteristics in the state of the optical disc used as reference with in the same way as the method for determining parameters Pws-ref, Pasy-ref and ν inherent in the medium used in the write power adjustment in the fourth and fifth embodiments.

For example, the parameters Msat, Pws and Pasy in Formula (1) are calculated so as to minimize the error between the reference modulation characteristics and Formula (1) such as, for example, the sum of squared errors, and these values are determined as Msat-opt, Pws-opt and Pasy-opt. Here, the coefficient ρ, the indicated write power Pind and the target coefficient value κ, which are the parameters used in the κ scheme, may also be determined by using the reference modulation characteristics. The value of the parameter used when calculating Pw-opt from Pws-opt should be determined by using the calculated values. For example, τ is determined as the ratio between Pw-opt and the calculated Pws-opt, and τ' is determined as the ratio between Pind and the calculated Pws-opt. Since various parameters are used when calculating Pw-opt from Pws-opt according to the calculation method as described in the eighth embodiment, parameters required in respective methods should be determined previously by using the values calculated from the reference modulation characteristics.

As for how to select parameters, the parameters should be selected so as to be able to finally determine the optimum write power Pw-opt in the write power adjustment as a whole. In other words, when implementing, for example, the write power adjustment method using the fitting method in the fourth embodiment, the reference write start power Pws-ref and the reference asymptotic power Pasy-ref have already been given as parameters to be used in fitting. As the parameter for determining Pw-opt on the basis of Pws-opt, the indicated write power Pind in the κ scheme, the ratio between Pw-opt and Pws-opt, the ratio between Pw-opt and Pasy-opt, or the reference optimum write power Pw-opt-ref may be used.

The method for conducting fitting to the reference modulation characteristics is not restricted to the above-described method, but the method described in the sixth embodiment may also be used.

Twelfth Embodiment

The present embodiment is an embodiment in which fixed values determined in the first to eleventh embodiments are previously written in the DI (Disc Information) of control data in a predetermined area, such as, for example, the management area of the medium. As for a combination concerning the first to eleventh embodiments, any combination may be used.

Figure 12:
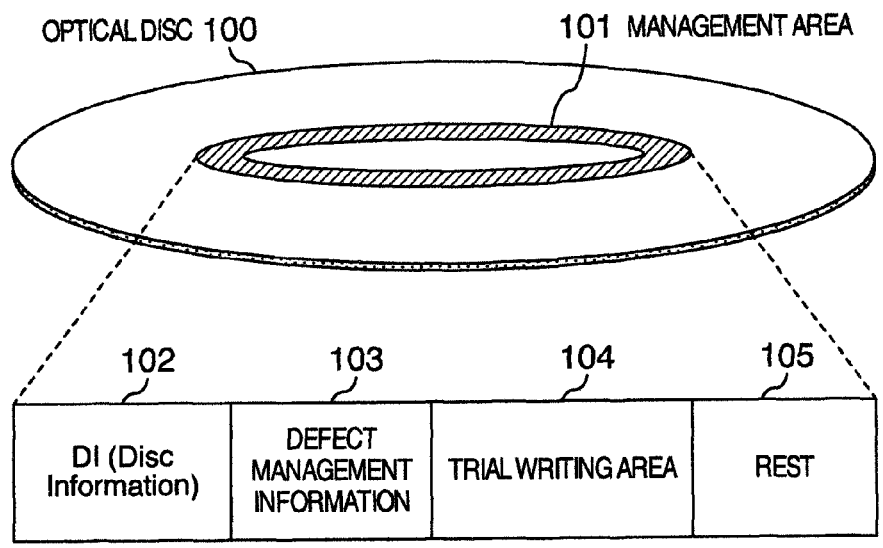
FIG. 12 is a diagram showing a configuration of a write medium according to the present invention.

The information used for setting write power Pw,m of a plurality of kinds acquired previously, information used for fitting, and/or information used to calculate the optimum write power Pw-opt from the optimum write start power Pws-opt, which are used in the write power adjustment according to the present invention are written in the management area of the optical disc and/or stored in the storage part in the optical disc apparatus. FIG. 12 is a diagram showing a management area 101 of the optical disc and DI (Disc Information) 102 which is information contained in the management area. The information previously acquired and used in the write power adjustment method according to the present invention is previously written in the DI information 102. If the information previously acquired and used in the write power adjustment method is stored in the optical disc apparatus, information of these kinds is stored in the storage part shown in FIG. 7.

Information of these kinds may be written in the management area of the optical disc and/or stored in the storage part in the optical disc apparatus as information that is not information to be used directly in the use method but information which can be used in a method similar to the use method by using a previously acquired calculation method. Here, a previously acquired constant may also be written in the management area of the optical disc and/or stored in the storage part in the optical disc apparatus. For example, the ratio τ between the reference write start power Pws-ref and the reference asymptotic power Pasy-ref to be used when conducting fitting to the measured modulation characteristics in the fifth embodiment should be calculated as τ=Pws-ref/Pasy-ref by, for example, acquiring the reference write start power Pws-ref and the reference asymptotic power Pasy-ref, without directly acquiring the ratio τ from the management information in the optical disc and/or the storage part in the optical disc apparatus.

Thirteenth Embodiment

In the present embodiment, a method for implementing the κ scheme having higher precision by applying the fitting method in the fourth embodiment to the κ scheme will be described.

In this method, the reference asymptotic power Pasy-ref, the reference write start power Pws-ref, and the ratio τ'=Pws-ref/Ptarget-opt between the reference write start power Pws-ref and Ptarget-opt are used in addition to the indicated write power Pind, and the ratio ρ=Pw-opt/Ptarget-opt between the optimum write power Pw-opt and the optimum target write power, which are the parameters used in the κ scheme. These parameters are acquired previously before the write power adjustment. Here, Pind, ρ, Pasy-ref, Pws-ref and τ' are values calculated from the same reference modulation characteristics in the optical disc.

Figure 13:
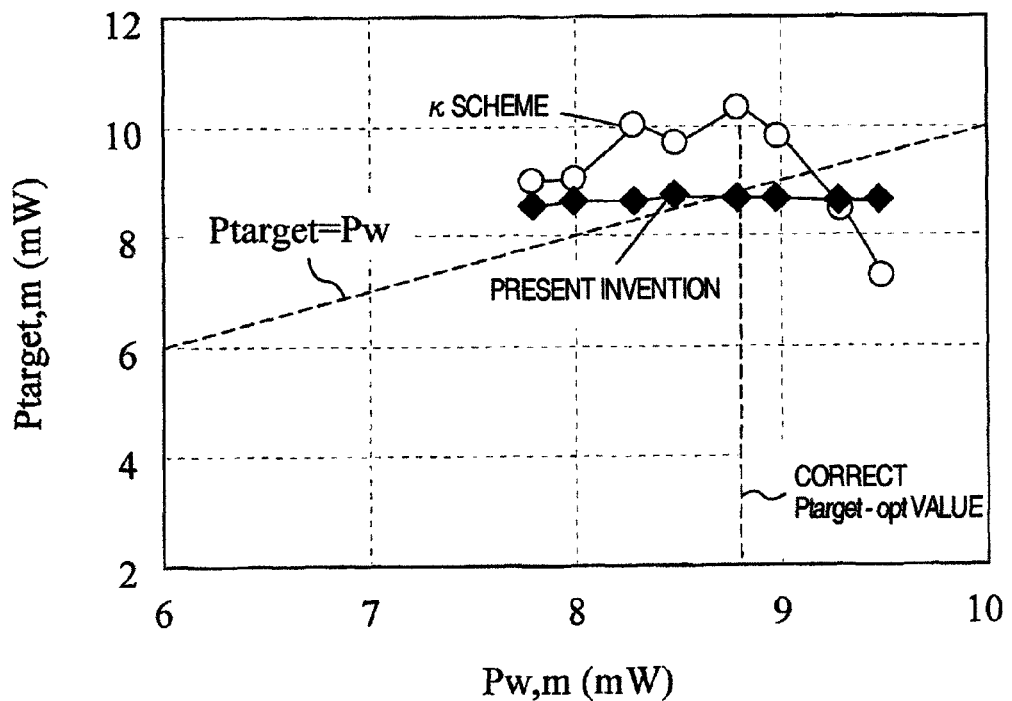
FIG. 13 is an exemplifying diagram showing a relation between write power Pw,m and target write power Ptarget-opt,m in the case where a procedure for approximating modulation characteristics by using reference asymptotic power Pasy-ref and reference write start power Pws-ref is applied to the κ scheme and in the case where the procedure is not applied to the κ scheme.

Modulations M,m associated with write powers Pw,m are acquired by setting write power Pw,m of a plurality of kinds in a write power range of ±10% having Pind as its center, writing a random pattern having a predetermined length with respective write powers, and reading the written signal. The target write power Ptarget,m is calculated by conducting the fitting described in the fourth embodiment in a range of ±3% having the write power Pw,m as its center, and multiplying calculated optimum write start power Pws-opt,m by τ'. A relation between a center value Pw,m of the range in which the fitting is conducted and the calculated Ptarget,m is shown in FIG. 13. A result obtained by calculating Ptarget,m by using the conventional κ scheme every write power range in the same way as the foregoing description is also shown in FIG. 13. The optimum target write power Ptarget-opt is given as an intersection of a data curve and Ptarget=Pw shown in FIG. 13. Unlike the Ptarget-opt value calculated according to the present invention, an erroneous value is calculated as the Ptarget-opt value in the κ scheme because of a variation in its data curve, as appreciated from FIG. 13. This is because the κ scheme is apt to be influenced by the local variation of the modulation characteristics. Since Ptarget,m assumes a constant value irrespective of the write power Pw,m in the present invention, it is appreciated that fitting to the modulation characteristics can be conducted with high precision and Ptarget-opt can be calculated as an average value of Ptarget,m. The optimum write power Pw-opt is calculated by calculating Ptarget-opt as the average value of Ptarget,m and multiplying Ptarget-opt by the coefficient ρ.

Thus, it can be confirmed that calculation of the optimum target write power Ptarget-opt in the κ scheme is facilitated and the optimum write power Pw-opt can be determined with high precision by applying the present invention to the κ scheme.

Fourteenth Embodiment

In the present embodiment, the case where the relation between the write power and the evaluated value and the index of the error of the approximating straight line in the sixth or eleventh embodiment are changed will be described. Since unchanged parts are the same as those in the first, fourth or fifth embodiment, description of them will be omitted in the present embodiment.

As an index of errors which is different from square errors used in the least square method, the sum of distances between the write power versus the evaluated value relation and approximating straight line, the standard deviation σ, the correlation coefficient r, and the coefficient of determination R2 may be used.

No matter which index is used, the precision of the write power adjustment is not degraded as long as the same index is used. If an index is previously determined, therefore, any index may be used to evaluate the error.

The above-described embodiments are a part of embodiments according to the present invention. The embodiments according to the present invention are not restricted to the above-described embodiments. If an embodiment uses a principal part of the present invention, similar effects might be obtained even if there is a difference in details.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. An evaluation method, comprising the steps of:
fitting a modulation characteristic formula $M,m=Msat(1-(Pws-Pasy)/(Pw,m-Pasy))$ having a saturated modulation Msat, write start power Pws, and asymptotic power Pasy as parameters to a relation between a plurality of kinds of write power Pw,m and a modulation M,m which is obtained from a signal amplitude of a trial-written signal, and finding an index value of an error which occurs in the fitting step; and
evaluating whether or not the relation between the write power and the modulation is valid for write power adjustment by using the index value of the error and a predetermined value.

2. An information write method, comprising the steps of:
fitting a modulation characteristic formula $M,m=Msat(1-(Pws-Pasy)/(Pw,m-Pasy))$ having a saturated modulation Msat, write start power Pws, and asymptotic power Pasy as parameters to a relation between a plurality of kinds of write power Pw,m and a modulation M,m which is obtained from a signal amplitude of a trial-written signal, and finding an index value of an error which occurs in the fitting step;
evaluating whether or not the relation between the write power and the modulation is valid for write power adjustment by using the index value of the error and a predetermined value; and
setting the write power based on an evaluation result of the evaluating step and executing a write power process with the set write power.

3. An evaluation method, comprising the steps of:
fitting a modulation characteristic formula $M,m=Msat(1-(Pws-Pasy)/(Pw,m-Pasy))$ having a saturated modulation Msat, write start power Pws, and asymptotic power Pasy as parameters to a relation between a plurality of kinds of write power Pw,m and a modulation M,m which is obtained from a signal amplitude of a trial-written signal, and finding an index value of an error which occurs in the fitting step; and
evaluating whether or not the relation between the write power and the modulation is value for write power adjustment by using the index value of the error and a predetermined value;
wherein the fitting step is performed by calculating an optimum Pasy-opt, of the asymptotic power, which has a minimum of the error by using the relation between the write power Pw,m and the modulation M,m and an approximation straight line of the relation, and then calculating an optimum Pws-opt of the write start power and an optimum Msat-opt of the saturated modulation.

4. An information write method, comprising the steps of:
fitting a modulation characteristic formula $M,m=Msat(1-(Pws-Pasy)/(Pw,m-Pasy))$ having a saturated modulation Msat, write start power Pws, and asymptotic power Pasy as parameters to a relation between a plurality of kinds of write power Pw,m and a modulation M,m which is obtained from a signal amplitude of a trial-written signal, and finding an index value of an error which occurs in the fitting step; and
evaluating whether or not the relation between the write power and the modulation is valid for write power adjustment by using the index value of the error and a predetermined value;
wherein the fitting step is performed by calculating an optimum Pasy-opt, of the asymptotic power, which has a minimum of the error by using the relation between the write power Pw,m and the modulation M,m and an approximation straight line of the relation, and then by calculating an optimum Pws-opt of the write start power and an optimum Msat-opt of the saturated modulation; and
wherein the information write method further comprises the step of setting the write power based on an evaluation result of the evaluating step and executing a write power process with the set write power.

* * * * *